United States Patent [19]  [11] Patent Number: 4,587,698
Bonner et al.  [45] Date of Patent: May 13, 1986

[54] SCARFING METHOD AND APPARATUS

[75] Inventors: Stanley V. Bonner, Pottersville, N.J.; Frederic F. Baumann, Dansville, N.Y.

[73] Assignee: Foster Wheeler Energy Corporation, Livingston, N.J.

[21] Appl. No.: 705,856

[22] Filed: Feb. 27, 1985

Related U.S. Application Data

[63] Continuation of Ser. No. 368,059, Apr. 13, 1982.

[51] Int. Cl.[4] .............................................. B23P 17/00
[52] U.S. Cl. .................................. 29/33 A; 29/33 T; 409/292; 228/125
[58] Field of Search ............... 29/33 A, 33 D, 33 T; 409/297, 298, 138, 139, 131, 132, 140, 151, 152, 157, 290, 293; 83/914, 371, 368, 861; 228/19, 9, 125

[56] References Cited

U.S. PATENT DOCUMENTS

| | | | |
|---|---|---|---|
| 2,015,452 | 9/1935 | Jenkins et al. | 409/298 |
| 2,298,249 | 10/1942 | Brown | 219/81 |
| 2,473,584 | 6/1949 | Hallberg et al. | 409/290 |
| 2,646,651 | 7/1953 | Wilson | 51/100 |
| 2,975,265 | 3/1961 | Kaiser et al. | 83/914 |
| 3,269,248 | 8/1976 | Nast et al. | 83/371 |
| 3,355,991 | 12/1967 | Cox | 409/293 |
| 3,597,958 | 8/1971 | Gross | 72/331 |
| 3,741,071 | 6/1973 | Hoglund | 90/11 R |
| 4,047,470 | 9/1977 | Lorenz et al. | 409/157 |
| 4,163,346 | 8/1979 | Matson | 51/165.77 |
| 4,197,043 | 4/1980 | Houghton | 409/139 |
| 4,275,499 | 6/1981 | Bommart | 83/914 |
| 4,372,714 | 2/1983 | Theurer | 409/293 |

FOREIGN PATENT DOCUMENTS

| | | | |
|---|---|---|---|
| 907285 | 3/1954 | Fed. Rep. of Germany . | |
| 1402414 | 11/1963 | Fed. Rep. of Germany | 83/914 |
| 1527653 | 11/1970 | Fed. Rep. of Germany . | |
| 2301640 | 1/1974 | Fed. Rep. of Germany | 29/33 D |
| 2511004 | 8/1976 | Fed. Rep. of Germany . | |
| 0009187 | 1/1977 | Japan | 83/914 |
| 0413889 | 5/1966 | Switzerland | 409/297 |

Primary Examiner—Gil Weidenfeld
Assistant Examiner—Thomas M. Kline
Attorney, Agent, or Firm—Marvin A. Naigur; John E. Wilson; John P. Shannon, Jr.

[57] ABSTRACT

Cutters for removing excess weld material from elongated welds are moved by hydraulic cylinders into precise positions in proximity to the article having the welds to maintain the desired uniform thickness of the welds. The movement of the hydraulic cylinders is controlled by tracer control valves having operating elements engaged by members connected to sensing rollers which engage the article as the article is moved past the sensing rollers. The positions of the rollers and the cutter are adjustable to accommodate articles of various sizes.

6 Claims, 2 Drawing Figures

SCARFING METHOD AND APPARATUS

This application is a continuation of application Ser. No. 368,059, filed Apr. 13, 1982.

BACKGROUND OF THE INVENTION

In the joining of two members by welding, an excess of weld material is usually deposited at the weld, especially where an elongated weld is involved. Such elongated welds are produced in the joining of fins to tubes for incorporation into heat transfer devices, like the walls of boilers. Typically, two fins are welded to each tube, with a weld placed on each side of the fin, at the juncture of each fin with the tube. Since four welds are used on each tube and since the tubes are scores of feet long, a considerable amount of excess weld is deposited.

Heretofore, excess weld has been removed or scarfed by hand tools, which is time consuming, expensive and imprecise.

SUMMARY OF THE INVENTION

It is therefore an object of the present invention to provide a scarfing method and apparatus which is fast and which removes excess weld precisely.

It is another object of the present invention to provide a scarfing method and apparatus which senses changes in the position of the welds and adjusts the scarfing apparatus accordingly.

Toward the fulfillment of these and other objects, the scarfing method and apparatus to the present invention includes rollers or other sensing elements for engaging an article having a weld, which in the case of a finned tube involves engaging either the free edges of fins welded to the tube or the tube itself to determine the position of the weld as the tube is moved in its axial direction. The sensing elements engage the styli or control stems of respective tracer control valves, which control the flow of pressure fluid to pressure fluid cylinders. The pressure fluid cylinders are connected to cutters, to incrementally move the cutters toward and away from the tube in accordance with the determination of the sensing elements, so that the thickness of the weld is precisely controlled and the excess weld material is removed.

DETAILED DESCRIPTION OF THE PREFERRED EMBODIMENT

Figure 1:
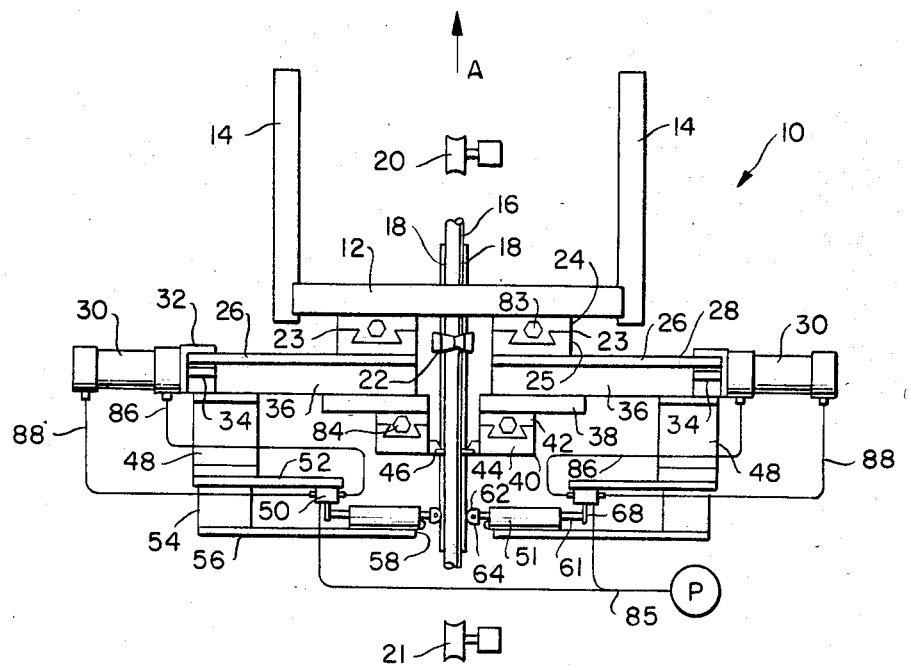
FIG. 1 is a plan view of the scarfing apparatus according to the present invention.

As is illustrated in FIG. 1, the scarfing apparatus according to the present invention, which is designated generally by the reference numeral 10, includes a vertically oriented mounting plate 12 which is stabilized by a pair of stabilizing panels 14 past which is moved the article to be scarfed, which in FIG. 1 is shown to be a boiler tube 16 having a fin 18 welded to each of the opposite lateral sides thereof. The tube 16 with the fins 18 is drawn from a welding area, in the direction of the arrow A of FIG. 1, by any suitable means, such as by pairs of frictionally engaging drive rollers 20 and 21, one roller of each of which is shown in FIG. 1.

A pair of stabilizing rollers 22 are provided adjacent to the support plate 12 and may be mounted on the support plate, one above the tube 16 and one below the tube to guide the travel of the tube as it is drawn through the scarfing apparatus by the drawing means.

A pair of horizontally spaced, vertically oriented slides 23 is secured to the side of the mounting plate 12 which is upstream with respect to the direction of travel of the tube 16. Each slide 23 includes a base 24 which is attached to the mounting plate 12 and a saddle 25 which mates with the base 24 in a dovetail relationship and which slides relative thereto. The entire remainder of the scarfing apparatus 10 is mounted on the saddles 25 of the slides 23. Mounted to each saddle 25 and extending laterally therefrom is a base 26 of a horizontally disposed slide 28. At the lateral ends of each base 26 is mounted at fluid pressure cylinder 30, such as a hydraulic cylinder or a compressed air cylinder. The cylinders 30 are mounted on the base 26 by means of an L-shaped member 32 welded to the base 26 or attached by fasteners or by any other suitable means. Each fluid pressure cylinder 30 is a conventional cylinder, such as a hydraulic cylinder of the double-acting type having a pressure fluid inlet at each end, for moving a piston incrementally in either direction in the cylinder. Each piston includes an extending elongated element, such as a piston rod 34, which engages the lateral end of a saddle 36 of the slide 28 so that, as the piston moves in the cylinder 30, the associated saddle 36 moves with respect to its base 26.

A support plate 38 is mounted near the end of the saddle 36 adjacent the tube 16, and a vertical dovetail slide 40 is mounted at the inner end of each support plate 38, each slide 40 having a base 42 which is attached to the support plate 38 and a saddle 44 which moves up and down relative to the base 42. On the side of each saddle 44 facing the tube 16 is a cutter 46, each cutter having two cutting elements, one cutting element for removing the excess weld or flash from the weld above the juncture of the tube 16 and the fin 18 and the other cutting element for the weld below the juncture. The cutting elements can be blades suitably shaped and angled to provide the desired weld, or they can be abrasive wheels or other devices.

A pair of spacer elements 48 are mounted at the lateral ends of the saddles 36 for supporting tracer control valves 50 and sensing element support members 51 upstream from the cutters 46. Each tracer control valve 50 is adjustably mounted at the inner end of a base 52 of a horizontally oriented dovetail slide, which is in turn mounted at the upstream end of each spacer element 48. An auxiliary spacer element 54 defines a saddle which mates with the base 52 and extends upstream from the base 52 to support a plate 56 which extends toward the tube 16 and defines at its inner end the saddle of a dovetail slide 58. A mating base is defined on the sensing element support member 51 which receives a tail member 61 connected to a sensing element such as a roller 62, which engages either the free edge of the fin 18 or a lateral surface of the tube 16 in order to determine variations in the position of the welds. Variations in the positions in the welds are primarily due to variations in the wall of the tube 16, thereby making it possible to detect changes in the welds by engaging the tube walls with the rollers 62. However, since the width of the fins 18 can be precisely controlled, variations in the lateral position of the fins 18 when they are welded to the tube 16 is due to variations in the wall of the tube 16, and so the positions of the welds can be determined by engaging the rollers 62 with the free edges of the fins 18, as is shown in FIGS. 1 and 2.

Figure 2:
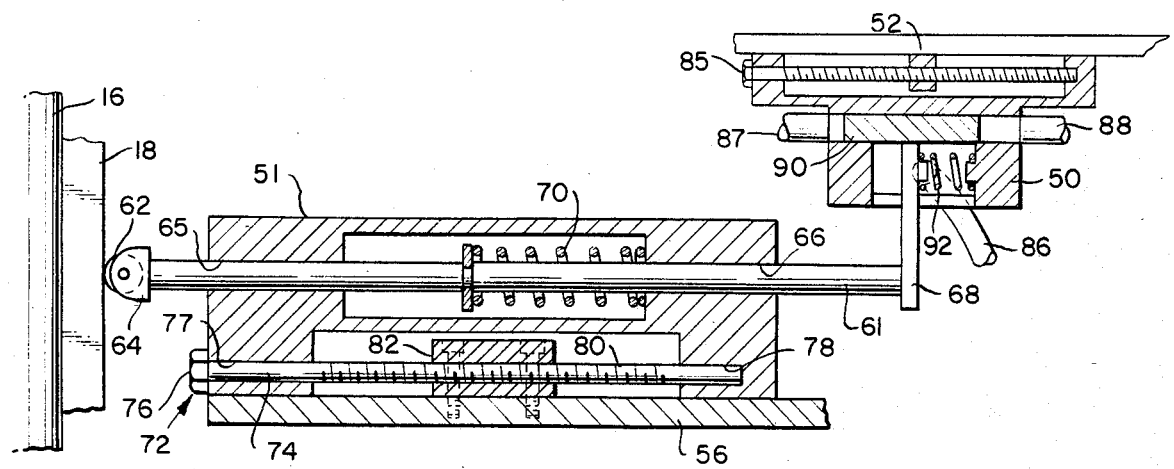
FIG. 2 is an enlarged cross section of a roller, slider member and tracer control valve showing schematically their internal operation.

As is best illustrated in FIG. 2, each roller 62 is mounted in a head 64 which is mounted on the inner end of the tail member 61. The tail member 61, which preferably comprises a rod, passes through bores 65 and 66 in the sensing element support member 51 to engage an operating stem 68 or stylus of the tracer control valve 50, and a spring 70 is provided to bias the roller 62 into engagement with the fin 18.

An adjustment mechanism 72 is provided to adjust the starting position of the sensing element support member 51 so that various sizes of tubes 16 and fins 18 can be accommodated. The adjustment mechanism includes an elongated rod 74 having a hexagonal head 76 and extending through bores 77 and 78 in the sensing element support member 51 which are parallel to the tail member 61. The elongated rod 74 has a threaded central section 80 which engages with threads formed in a bore extending through a block 82 secured to the plate 56 by screws or other suitable means. Thus, rotation of the hexagonal head 76 results in movement of the sensing element support member 51 with respect to the plate 56 to adjust its starting position of the sensing element support member 51. Similar adjustment mechanisms 83 and 84 are provided for the slides 23 and 40, respectively, and similar adjustment mechanisms are provided for the tracer control valves 50, an adjustment mechanism 85 being illustrated in FIG. 2 in connection with one of the tracer control valves. By manipulating the adjustment mechanisms 83 and 84, the sensing element support members 51 and the cutters 46 are adjustable in a direction perpendicular to the welds and perpendicular to the movement of the cutters 46 by the piston rods 34.

Each tracer control valve 50 includes an inlet line 86 connected to a source of pressure fluid such as a pump P, a line 87 extending to the inner end of the fluid pressure cylinder 30, and a line 88 extending to the lateral end of the pressure fluid cylinder 30. A schematic representation of the internal mechanism of the tracer control valve 50 includes a piston 90 connected to the operating stem 68 and operable to control the flow of pressure fluid from the inlet line 85 to the lines 87 and 88. A spring 92 is provided to bias the operating stem 68 into engagement with the tail member 61.

In operation, the slides 23 and 40 are adjusted so that the cutters 46 and the rollers 62 are at the proper level to engage the tube 16. The sensing element support member 51 and the tracer control valve 50 are also adjusted to provide a space of proper width between the rollers 62 to accommodate the tube 16 and fins 18. The tube 16 with the fins 18 welded thereto is drawn from a welding area upstream of the scarfing apparatus by the drive rollers 20 and 21 into engagement with rollers 62 and the cutters 46. The springs 70 bias the rollers 62 into engagement with the free edges of the fins 18, and the springs 92 bias the operating stems 68 of the tracer control valves 50 into engagement with the tail members 61. If the positions of welds vary as the tube 16 passes through the scarfing apparatus, the positions of the free edges of the fins 18 vary correspondingly and the rollers 62 move as a result of the variations. The movement of the rollers 62 is transmitted to the operating stems 68 of the tracer control valves 50 through the tail members 61. If a roller 62 moves laterally, the piston 90 of the associated tracer control valve 50 moves laterally to allow the flow of pressure fluid or additional pressure fluid from the inlet line 86 to the line 87. Such a flow causes the piston in the associated fluid pressure cylinder 30 to move laterally incrementally in an amount corresponding to the amount of change in the position of the weld. This movement is transmitted to the cutters 46 through the piston rod 34, the saddle 36 of the slide 28, the support plate 38 and the slide 40. Thus, the cutters 46 are moved laterally by an amount equal to the amount of variance in the position of the weld, thereby providing a weld of uniform thickness while removing excess weld material.

Other modifications, changes and substitutions are intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. Apparatus for removing excess weld material from an article having an elongated weld comprising:
    means for moving the article in a direction parallel to the elongated weld,
    a cutter for engaging the weld to remove excess weld material,
    a fluid pressure cylinder connected to the cutter for moving the cutter into engagement with the weld,
    sensing means engageable with the article for determining the position of the weld,
    fluid pressure control means, responsive to the sensing means, for actuating the fluid cylinder to move the cutter into engagement with the weld in accordance with the determination by the sensing means of the position of the weld, said fluid pressure control means including a valve,
    means for adjusting the position of said sensing means toward and away from the article, and
    means for adjusting the starting position of said valve relative to said sensing means and toward and away from the article,
    whereby the starting position of the sensing means relative to the article and the position of said valve relative to the sensing means may be adjusted.

2. The apparatus of claim 1 wherein the fluid pressure cylinder is a hydraulic cylinder.

3. The apparatus of claim 1 wherein the cutter is mounted on an element slidable toward and away from the weld, and the fluid pressure cylinder is connected to the slidable element.

4. The apparatus of claim 1 wherein the article has welds on opposite sides, and the apparatus includes a sensing means engageable with each side having a weld and a cutter for engaging each weld.

5. The apparatus of claim 1, further comprising means for adjusting the sensing means and the cutter in a direction perpendicular to the weld and perpendicular to the movement of the cutter into engagement with the weld.

6. The apparatus of claim 1 wherein said sensing means includes a roller, and a spring biasing said roller into engagement with the article.

* * * * *